US007987922B2

(12) United States Patent
Tokunaga

(10) Patent No.: US 7,987,922 B2
(45) Date of Patent: Aug. 2, 2011

(54) AUTOMATIC GEAR SHIFTING POWER TOOL

(75) Inventor: Manabu Tokunaga, Anjo (JP)

(73) Assignee: Makita Corporation, Anjo-shi (JP)

( * ) Notice: Subject to any disclaimer, the term of this patent is extended or adjusted under 35 U.S.C. 154(b) by 137 days.

(21) Appl. No.: 12/382,398

(22) Filed: Mar. 16, 2009

(65) Prior Publication Data

US 2009/0242226 A1 Oct. 1, 2009

(30) Foreign Application Priority Data

Apr. 1, 2008 (JP) ................................ 2008-095379

(51) Int. Cl.
*B23Q 5/02* (2006.01)

(52) U.S. Cl. ......... 173/178; 173/176; 173/216; 173/160

(58) Field of Classification Search .................. 173/178, 173/176, 216, 217, 160
See application file for complete search history.

(56) References Cited

U.S. PATENT DOCUMENTS

| | | | | |
|---|---|---|---|---|
| 3,960,035 | A * | 6/1976 | Workman et al. | 475/125 |
| 4,078,618 | A * | 3/1978 | DePagter et al. | 173/178 |
| 4,448,098 | A * | 5/1984 | Totsu | 81/467 |
| 4,966,057 | A * | 10/1990 | Koppatsch | 81/469 |
| 5,451,127 | A * | 9/1995 | Chung | 408/20 |
| 5,535,867 | A * | 7/1996 | Coccaro et al. | 192/56.1 |
| 6,142,242 | A * | 11/2000 | Okumura et al. | 173/48 |
| 6,142,243 | A * | 11/2000 | Mayer | 173/176 |
| 6,273,200 | B1 * | 8/2001 | Smith et al. | 173/216 |
| 6,431,289 | B1 * | 8/2002 | Potter et al. | 173/47 |
| 6,502,648 | B2 * | 1/2003 | Milbourne | 173/178 |
| 6,796,921 | B1 * | 9/2004 | Buck et al. | 475/299 |
| 2006/0097464 | A1 | 5/2006 | Strauch et al. | |
| 2008/0032848 | A1 | 2/2008 | Ho | |
| 2009/0098971 | A1 | 4/2009 | Ho et al. | |

FOREIGN PATENT DOCUMENTS

| | | | |
|---|---|---|---|
| CN | 101117999 | A | 2/2008 |
| EP | 0 787 931 | A1 | 8/1997 |
| GB | 2 399 148 | A | 9/2004 |
| JP | A-06-008151 | | 1/1994 |

OTHER PUBLICATIONS

European Search Report issued in Application No. 09004070.0; Dated Jul. 26, 2010.
Chinese Patent Office, Office Action issued Apr. 19, 2010 in Chinese Patent Application No. 200910118229.4 w/English-language Translation.

* cited by examiner

*Primary Examiner* — Brian D Nash
(74) *Attorney, Agent, or Firm* — Oliff & Berridge, PLC

(57) ABSTRACT

While a load torque applied to a tool shaft is lower than a predetermined value, a moving member is maintained at a first position, and a sun gear is rotated integrally with an internal gear. When the load torque applied to the tool shaft reaches or exceeds the predetermined value, the moving member is moved to a second position, to thereby prohibit relative rotation of the internal gear and a gear case. A latch member is engaged in a catching portion of the moving member when the moving member is moved to the second position, to thereby prevent the moving member from moving back to the first position. In this manner, repetitive switching between speed reduction ratios can be prevented even when the load torque applied to the tool shaft fluctuates.

16 Claims, 7 Drawing Sheets

AUTOMATIC GEAR SHIFTING POWER TOOL

CROSS-REFERENCE TO RELATED APPLICATION

This application claims priority to Japanese Patent Application No. 2008-095379, filed on Apr. 1, 2008, the contents of which are hereby incorporated by reference into the present application.

BACKGROUND OF THE INVENTION

1. Field of the Invention

The present invention relates to power tools, and in particular, to an automatic gear shifting power tool in which a speed reduction ratio is changed in accordance with a torque.

2. Description of the Related Art

Japanese Patent Application Publication No. 06-008151 discloses a power tool of an automatic gear shifting type. The power tool comprises a prime mover, a tool shaft driven by the prime mover and a gear reducer disposed between the prime mover and the tool shaft. The gear reducer is equipped with a planetary gear mechanism composed of a sun gear, a planet gear, an internal gear and a carrier.

In the gear reducer, the internal gear of the planetary gear mechanism is movably installed between a first position and a second position along an axial direction. When the internal gear is located in the first position, the internal gear and the sun gear are coupled together so as to be integrally rotated. On the other hand, when the internal gear is located in the second position, the internal gear is non-rotatably fixed. When the torque applied to the tool shaft is less than a predetermined value, the internal gear is retained in the first position, and when the torque applied to the tool shaft reaches or exceeds the predetermined value, the internal gear is moved to the second position. The gear reducer further includes a spring which biases the internal gear toward the first position when the internal gear is located on the first position side, and biases the internal gear toward the second position when the internal gear is located on the second position side.

According to the above-described configuration, as long as the torque applied to the tool shaft is less than the predetermined value, the planetary gear mechanism is maintained in a non-functional state in which a high-speed (low-torque) operation is performed. On the other hand, after the torque applied to the tool shaft has reached or exceeded the predetermined value, the planetary gear mechanism is shifted to a functional state in which a low-speed (high-torque) operation is performed. In other words, speed reduction ratio of the gear reducer is switched at a time when the torque applied to the tool shaft has reached or exceeded the predetermined value.

BRIEF SUMMARY OF THE INVENTION

In the above-described conventional power tool, once the internal gear has moved to the second position, the internal gear is retained in the second position by the spring. According to this configuration, even when the torque fluctuates over and below the predetermined value, a problem of repetitive switching between the speed reduction ratios can be prevented.

However, the internal gear is often applied with a strong force and is willing to move back to the first position. Therefore, the spring capable of strongly biasing the internal gear toward the second position is needed to ensure that the internal gear is retained in the second position by the spring. For this reason, it is necessary for the conventional power tool to include a spring of relatively large size, and accordingly to have a structure increased in size for the purpose of supporting such a large spring and bearing a force applied by the large spring.

The present teachings solve the aforesaid problem. According to the present teachings, the problematic repetition of switching between speed reduction ratios is prevented from occurring, without a large spring which exerts a great bias force.

A power tool according to the present teachings comprises a prime mover, a tool shaft driven by the prime mover, and a planetary gear mechanism disposed between the prime mover and the tool shaft. The planetary gear mechanism includes a sun gear, at least one planet gear, an internal gear, and a carrier. The planetary gear mechanism is capable of increasing the torque from the prime mover and transmitting the increased torque to the tool shaft.

The power tool further comprises a moving member which is configured to be at a first position while a torque applied to the tool shaft is less than a predetermined value, and to move to a second position when the torque applied to the tool shaft reaches the predetermined value. The moving member causes the internal gear to rotate integrally with the sun gear when it is at the first position, and prevents the internal gear from rotating when it is at the second position.

According to the above-described configuration, as long as the torque applied to the tool shaft is less than the predetermined value, the sun gear and the internal gear are integrally rotated and therefore the planetary gear mechanism does not function as a gear reducer. As a result, the tool shaft rotates at a high speed with a low torque. On the other hand, when the torque applied to the tool shaft reaches the predetermined value, rotation of the internal gear is prevented, which causes the planetary gear mechanism to function as the gear reducer. Consequently, the tool shaft rotates at a low speed with a high torque. In this manner, the rotation speed of the tool shaft is automatically changed from the high speed to the low speed by the increase of the torque applied to the tool shaft.

The power tool further comprises at least one latch member. When the moving member moves to the second position, the latch member is engaged with the moving member. The moving member is prevented from moving back again to the first position.

According to the configuration, once the moving member has moved to the second position, the moving member is retained at the second position even when the torque applied to the tool shaft becomes lower. Thus, the switching between the speed reduction ratios is not repeated even when the torque fluctuates above and below the predetermined value.

According to the above-described configuration of the power tool, repetitive switching between the speed reduction ratios is prevented, so that smooth switching between the speed reduction ratios can be achieved.

It is preferable for the above-described moving member to have at least one catching portion for engaging with the latch member. In this case, it is preferable that, when the moving member moves to the second position, the latch member is moved to the catching portion of the moving member for engagement with the moving member. According to this configuration, the latch member engaged with the catching portion physically hampers the moving member from moving back to the first position.

Preferably, a moving direction of the latch member is substantially perpendicular to a moving direction of the moving member. In this case, it is preferable that the moving direction of the moving member is parallel to an axial direction of the internal gear of the planetary gear mechanism, whereas the moving direction of the latch member is perpendicular to the axial direction of the internal gear in the planetary gear mechanism. When the moving direction of the latch member is perpendicular to that of the moving member, the latch member can be strongly engaged with the moving member, which, in turn, engagement between the latch member and the moving member is reliably maintained.

Preferably, the moving member is ring-shaped, and disposed coaxially with the internal gear of the planetary gear mechanism. According to this configuration, the power tool can be made in a compact size.

Preferably, the ring-shaped moving member and the internal gear of the planetary gear mechanism are integrally composed of a single member. In this case, the internal gear of the planetary gear mechanism is formed on an inner peripheral surface of the ring-shaped moving member, while at least one catching portion is formed on an outer peripheral surface of the ring-shaped moving member. In this configuration, because there is no need to separately provide the internal gear and the moving member, the number of components for the power tool can be reduced.

In a case where the internal gear is integrally formed with the moving member, it is preferable that the catching portion formed on the moving member has an anterior end and a posterior end with respect to a rotation direction of the sun gear, and extends from the anterior end to the posterior end along a circumferential direction of the moving member.

The moving member including the internal gear is integrally rotated with the sun gear at the first position. Therefore, when the moving member is moved to the second position, the latch member comes to be engaged with the catching portion of the moving member that is rotating. At this time of engagement, if the catching portion is extended along the circumferential direction of the moving member, the latch member can be quickly engaged with the catching portion of the moving member regardless of a rotational position of the moving member. In addition, the catching portion has a finite length defined by the anterior end and the posterior end. Therefore, the latch member having been engaged with the catching portion is brought into contact with the anterior end of the catching portion, thereby non-rotatably fixing the moving member including the internal gear. According to this configuration, the latch member engaged with the catching portion functions not only to prevent the moving member from moving back to the first position but also to non-rotatably fix the internal gear.

Preferably, the catching portion of the moving member has a contact wall that contacts the latch member from a second position side. In this case, it is preferable that the contact wall extends from the anterior end to the posterior end, and a part of the contact wall adjacent to the anterior end is shifted to the first position side toward the anterior end.

In this configuration, the moving member is prevented from moving back to the first position by the contact wall of the catching portion which contacts, from the second position side, the latch member engaged with the catching portion. In addition, when the latch member is brought into contact with the anterior end of the catching portion, the moving member moves so as to be further spaced away from the first position by the contact wall having been shifted to the first position side. In this manner, the moving member is reliably prevented from moving back to the first position.

In the above-described configuration, it is preferable that the latch member is sphere-shaped. In this case, it is preferable that the above-described part of the contact wall adjacent to the anterior end is curved along an arc which is larger in radius than the sphere-shaped latch member.

Such a sphere-shaped outline of the latch member facilitates smooth engagement of the latch member in the catching portion of the moving member. Moreover, the part of the contact wall adjacent to the anterior end, which is curved along the arc whose radius is greater than that of the latch member facilitates movement of forcing the moving member to be further spaced away from the first position. According to the configuration, further smooth switching between the speed reduction ratios can be achieved.

In the above-described catching portion, it is preferable that a part of the contact wall adjacent to the posterior end is also shifted to the first position side toward the posterior end.

Depending on the shape of the latch member, the latch member sometimes starts engaging with the catching portion of the moving member prior to arrival of the moving member at the second position. Because the moving member including the internal gear is integrally rotated with the sun gear, the latch member having started engaging with the catching portion is brought into contact with the posterior end of the catching portion. At this point of contact, the part of the contact wall adjacent to the posterior end which is shifted to the first position side facilitates movement of the moving member to the second position, which can lead to smooth switching between the speed reduction ratios.

Preferably, the power tool is additionally provided with a lock member that functions, when the latch member is engaged in the moving member, to retain engagement of the latch member in the moving member.

According to this configuration, undesired release of the engagement between the moving member and the latch member can be prevented. In other words, undesired switching of the speed reduction ratio can be prevented.

Preferably, the lock member is configured to move from an unlock position to a lock position when the latch member is engaged in the moving member. In this case, it is preferable that the lock member has a perpendicular contact surface for contacting the latch member when the lock member is moved to the lock position. Here, it is preferable that the perpendicular contact surface is perpendicular to the moving direction of the latch member, and parallel to the moving direction of the lock member.

In this configuration, because the direction of force exerted from the latch member onto the lock member intersects at right angles with the direction along which the latch member can move, the lock member can retain the engagement of the latch member with reliability.

Preferably, the lock member further includes an inclined contact surface for contacting the latch member at the unlock position. The inclined contact surface is inclined with respect to both the moving direction of the latch member and the moving direction of the lock member. The inclined contact surface biases the lock member to push the latch member against the moving member when the latch member is not engaged in the moving member.

In this configuration, the latch member is also pushed toward the moving member by pushing the lock member against the latch member. Thus, because there is no need to separately install a spring for biasing the latch member, the structure of the power tool can be simplified.

DETAILED DESCRIPTION OF THE INVENTION

Preferred Features of an Embodiment of the Invention

Feature 1: A gear reducer comprises a plurality of planetary gear mechanisms which are connected in series to each other. More specifically, a carrier in one of the planetary gear mechanisms mounted on a motor side is integrally fixed to a sun gear in another planetary gear mechanism mounted on a tool shaft.

Feature 2: A latch member is composed of a steel ball such as a ball used for a ball bearing or the like. The steel ball is housed in a through hole formed on a circumferential wall of a gear case.

Feature 3: A lock member is a ring-shaped component which is slidably attached to an outer peripheral surface of the gear case.

Feature 4: A moving member is a ring-shaped component which has an internal peripheral surface on which an internal gear engaged with a planetary gear is formed and an outer peripheral surface on which a groove-shaped catching portion to be engaged with the latch member is formed. The groove-shaped catching portion is extended along a circumferential direction of the moving member and defined by a finite length.

Embodiment of the Invention

Figure 1:
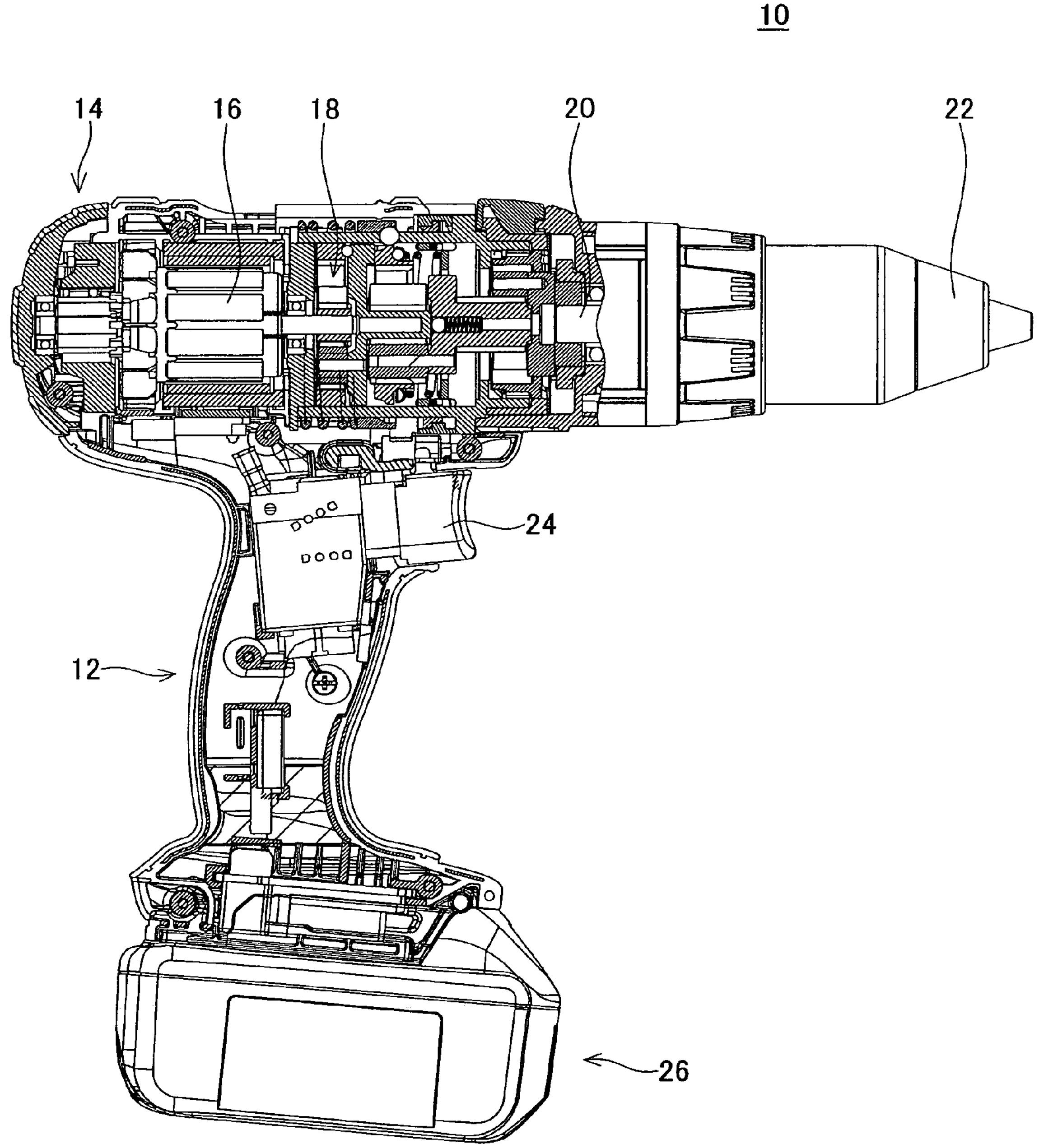
FIG. 1 is a side view showing an electric drill (in a partial cross-sectional view)

A power tool embodying the present teachings will be described with reference to drawings. FIG. 1 is a partial cross-sectional diagram showing the structure of a power tool 10 according to an embodiment of the present teachings. The power tool 10 is a drill driver equipped with an electric motor as a prime mover, and is used for drilling work or screw fastening work.

As shown in FIG. 1, the power tool 10 generally includes a body part 14 that has a roughly cylindrical shape and a grip part 12 laterally extended from the body part 14. A battery pack 26 is detachably mounted on an end section of the grip part 12. A user of the power tool 10 holds the grip part 12 to use the power tool 10.

In the body part 14, a motor 16, a tool shaft 20 rotationally driven by the motor 16, and a gear reducer 18 disposed between the motor 16 and the tool shaft 20 are housed. The gear reducer 18 reduces the speed of rotation (i.e. increases a torque of rotation) of the rotational power that is input from the motor 16 and outputs the rotational power having been reduced in speed (while being increased in torque) to the tool shaft 20. A tool chuck 22 is fixed to the tool shaft 20. The tool chuck 22 is capable of detachably holding various types of tool bits such as a driver bit and a drill bit.

The grip part 12 is provided with a trigger switch 24 which is a control switch for starting/stopping the motor 16. The motor 16 starts rotating when a user pulls the trigger switch 24, and the motor 16 stops when the user releases the trigger switch 24. In other words, the user action of pressing down the trigger switch 24 causes the tool chuck 22 to rotate, while the user action of releasing the trigger switch 24 causes the tool chuck 22 to stop.

The gear reducer 18 has an automatic gear shifting function. When a torque applied to the tool shaft 20 reaches or exceeds a predetermined value, the gear reducer 18 increases a speed reduction ratio, and thereby an operation mode is shifted from a high-speed operation mode (i.e. low-torque operation mode) to a low-speed operation mode (i.e. high-torque operation mode).

Figure 2:
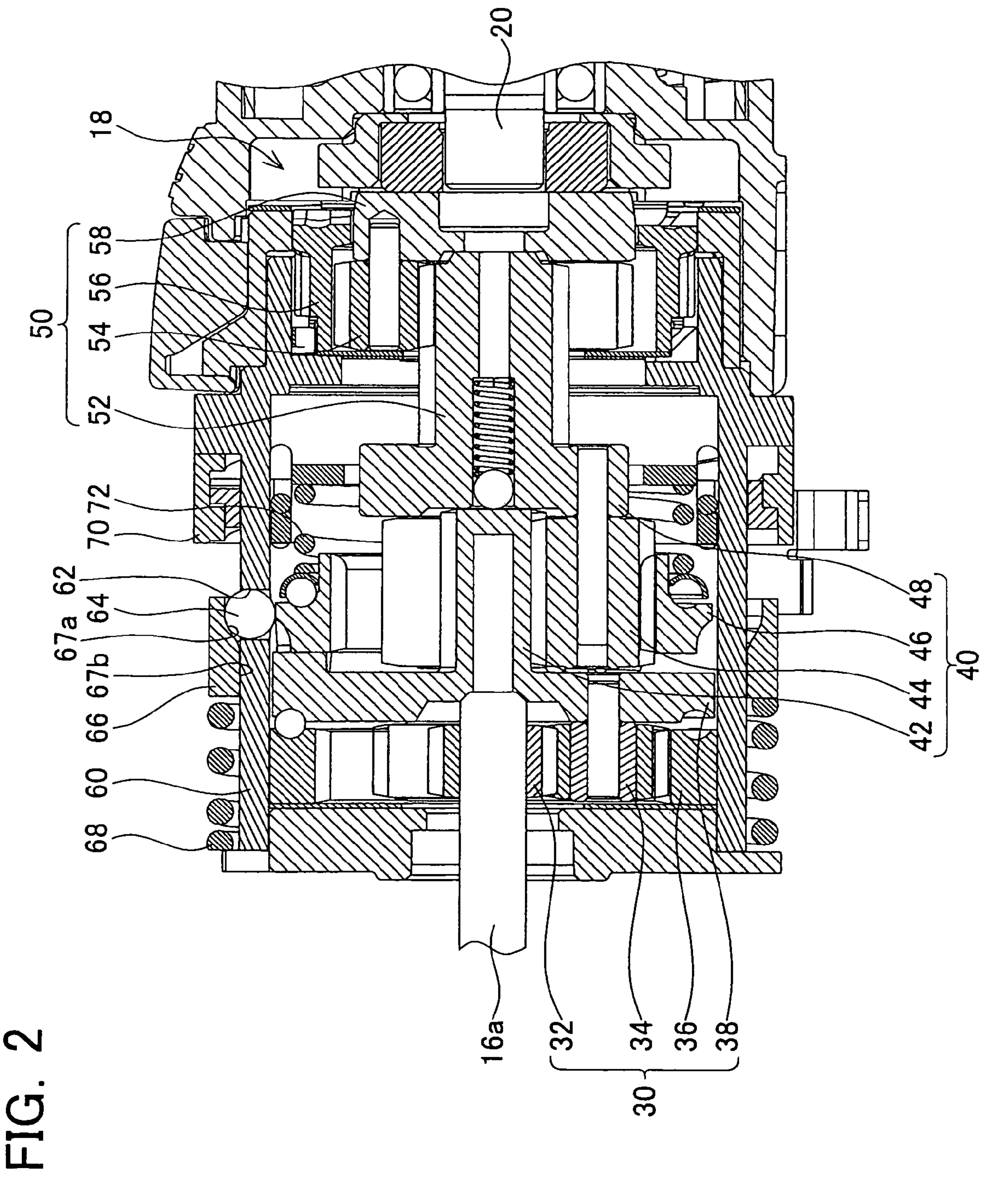
FIG. 2 is a cross-sectional view of a structure of a gear reducer (in a high-speed operation mode)
Figure 3:
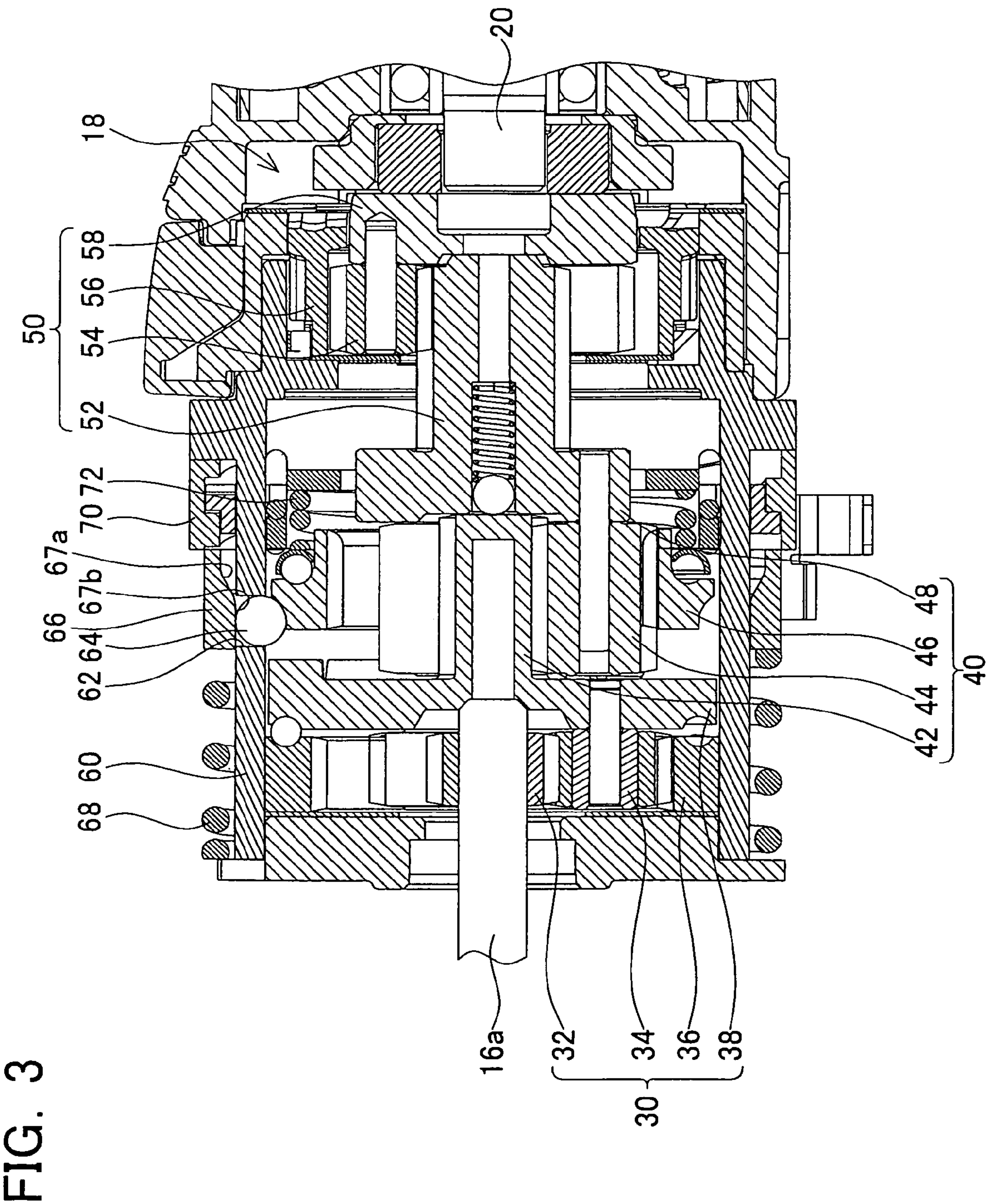
FIG. 3 is another cross sectional view of the structure of the gear reducer (in a low-speed operation mode)
Figure 4:
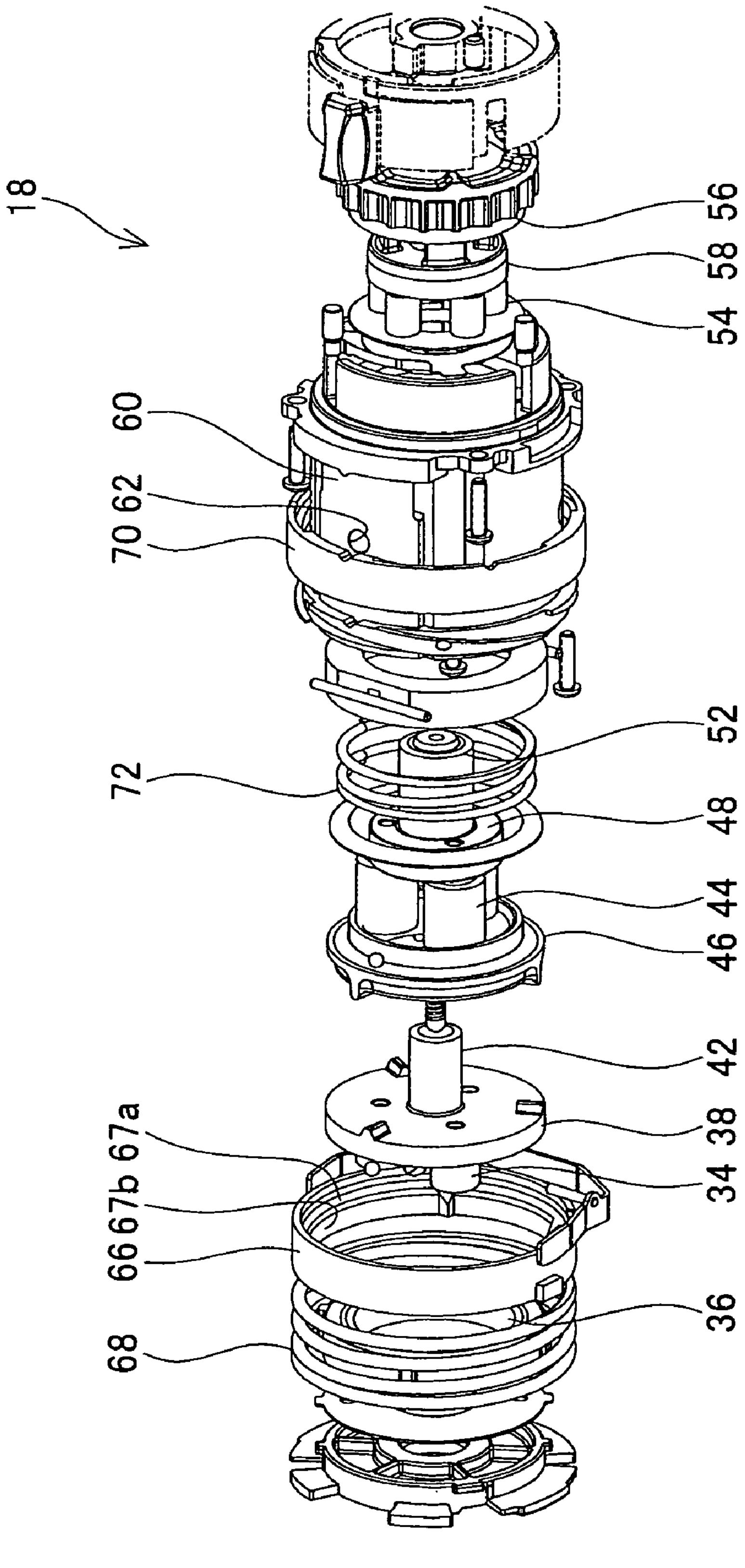
FIG. 4 is a perspective exploded view of the gear reducer.

With reference to FIGS. 2, 3, and 4, the structure of the gear reducer 18 will be described in detail below. FIG. 2 shows the gear reducer 18 functioning in the high-speed operation mode. FIG. 3 shows the gear reducer 18 functioning in the low-speed operation mode. FIG. 4 is a perspective exploded view of the gear reducer 18.

The gear reducer 18 comprises a cylindrically-shaped gear case 60 fixed to the body part 14 and three planetary gear mechanisms 30, 40, and 50. Hereinafter, the three planetary gear mechanisms 30, 40, and 50 will be respectively referred to, in order of position from a motor 16 side, as a first planetary gear mechanism 30, a second planetary gear mechanism 40, and a third planetary gear mechanism 50.

The first planetary gear mechanism 30 comprises a first sun gear 32, three first planet gears 34, a first internal gear 36, and a first carrier 38. The first sun gear 32 is fixed to a motor shaft 16*a*. The three first planet gears 34 are arranged around the first sun gear 32 while engaging with the first sun gear 32. The first internal gear 36 is disposed coaxially with the first sun gear 32 and engaged with the first planet gears 34 while surrounding the first planet gears 34. The first internal gear 36 is fixed to the gear case 60 in a state of not being able to rotate (such a state hereinbelow will be termed 'non-rotatably fixed'). The first carrier 38 rotatably supports the three first planet gears 34. On the other hand, the first carrier 38 is rotatably supported by the gear case 60 on the same axis with the first sun gear 32. The first carrier 38 is connected to the second planetary gear mechanism 40. In the first planetary gear mechanism 30, a torque from the motor 16 is input into the first sun gear 32, and the input torque is amplified therein and, after the amplification, the amplified torque is output from the first carrier 38 to the second planetary gear mechanism 40.

The second planetary gear mechanism 40 comprises a second sun gear 42, three second planet gears 44, a second internal gear 46, and a second carrier 48. The second sun gear 42 is fixed to the first carrier 38 of the first planetary gear mechanism 30 and integrally rotated with the first carrier 38. The three second planet gears 44 are disposed around the second sun gear 42 while engaging with the second sun gear 42. The second internal gear 46 is disposed coaxially with the second sun gear 42 and engaged with the second planet gears 44 while surrounding the second planet gears 44. The second carrier 48 rotatably supports the three second planet gears 44. On the other hand, the second carrier 48 is rotatably supported coaxially with the second sun gear 42 by the gear case 60. The second carrier 48 is connected to the third planetary gear mechanism 50. In the second planetary gear mechanism 40, the torque from the first planetary gear mechanism 30 is input into the second sun gear 42, and the input torque is output from the second carrier 48 to the third planetary gear mechanism 50.

The second internal gear 46 of the second planetary gear mechanism 40 is housed in the gear case 60. The second internal gear 46 is supported in such a manner that the second internal gear 46 can move parallel to a rotation axis of the second internal gear 46 between a first position situated close to the first carrier 38 (refer to FIG. 2) and a second position spaced away from the first carrier 38 (refer to FIG. 3). Further, the second internal gear 46 is biased against the first carrier 38 by a coil spring 72. In other words, the second internal gear 46 is biased toward the first position. As such, the second internal gear 46 is a ring-shaped moving member capable of moving between the first position and the second position, and a group of gears engaged with the first carrier 38 are formed on an inner peripheral surface of the second internal gear 46.

As will be described in detail below, the power tool 10 is configured to have its operation mode be switched between the high-speed operation mode and the low-speed operation mode by the second internal gear 46 moving between the first position and the second position.

The third planetary gear mechanism 50 comprises a third sun gear 52, six third planet gears 54, a third internal gear 56, and a third carrier 58. The third sun gear 52 is fixed to the second carrier 48 of the second planetary gear mechanism 40, to thereby rotate integrally with the second carrier 48. The six third planet gears 54 are arranged around the third sun gear 52 while engaging with the third sun gear 52. The third internal gear 56 is disposed coaxially with the third sun gear 52 and engaged with the third planet gears 54 while surrounding the third planet gears 54. The third internal gear 56 is non-rotatably fixed to the gear case 60. The third carrier 58 rotatably supports the six third planet gears 54, and is rotatably supported by the gear case 60 on the same axis with the third sun gear 52. The third carrier 58 is connected to the tool shaft 20. In the third planetary gear mechanism 50, the torque from the second planetary gear mechanism 40 is input into the third sun gear 52, and the input torque is amplified therein and, after the amplification, the amplified torque is output from the third carrier 58 to the tool shaft 20.

Next, a configuration of the first carrier 38, the second sun gear 42, and the second internal gear 46 will be described.

Figure 5:
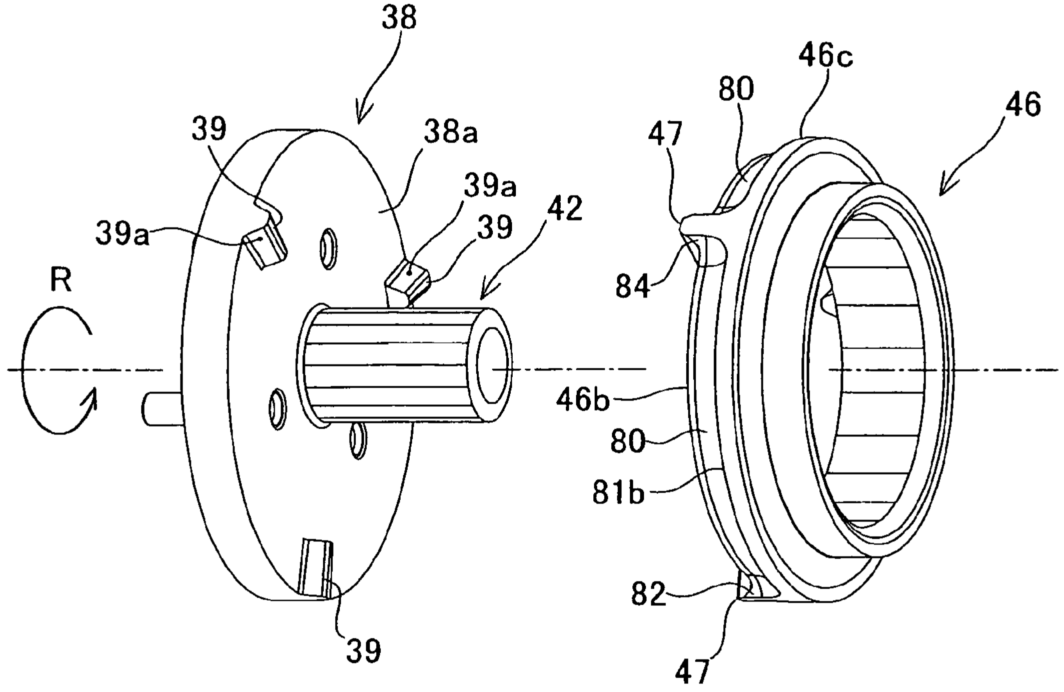
FIG. 5 is a perspective view showing a first carrier, a second sun gear, and a second internal gear.
Figure 6:
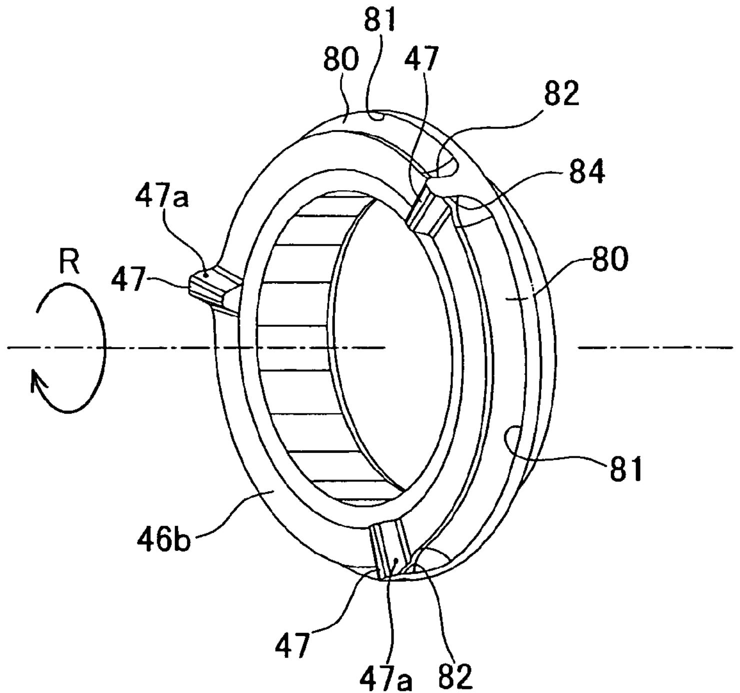
FIG. 6 is a perspective view of the second internal gear.

As shown in FIG. 5, the first carrier 38 is integrally formed with the second sun gear 42. The first carrier 38 has an end surface 38*a* opposed to and facing the second internal gear 46. Three clutch projections 39 projecting toward the second internal gear 46 are formed on the end surface 38*a* of the first carrier 38. Specifically, the clutch projections 39 are formed on the circumferential edge of the end surface 38*a*. On the other hand, the second internal gear 46 has an end surface 46*b* opposed to and facing the end surface 38*a* of the first carrier 38 as shown in FIGS. 5 and 6. Three clutch projections 47 projecting toward the first carrier 38 are formed on the end surface 46*b* of the second internal gear 46. Specifically likewise, the clutch projections 47 are formed on the circumferential edge of the end surface 46*b*.

When the second internal gear 46 is located in the first position close to the first carrier 38 (in a condition shown in FIG. 2), the clutch projections 39 of the first carrier 38 are coupled to the clutch projections 47 of the second internal gear 46, which joins the first carrier 38 (with the second sun gear 42) and the second internal gear 46 together with respect to a rotational direction R. When the first carrier 38 and the second internal gear 46 are joined, the first carrier 38, the second sun gear 42, the second planet gears 44, the second internal gear 46, the second carrier 48, and the third sun gear 52 are integrally rotated all together. In this case, the second planetary gear mechanism 40 does not function as a speed reducing device. Consequently, a speed reduction ratio (torque increase ratio) of the gear reducer 18 is decreased, thereby causing the power tool 10 to perform high-speed (low-torque) operation.

On the other hand, when the second internal gear 46 moves to the second position (a condition shown in FIG. 3), the clutch projections 39 of the first carrier 38 are decoupled from the clutch projections 47 of the second internal gear 46, thereby releasing the joining between the first carrier 38 and the second internal gear 46. In this case, the second planetary gear mechanism 40 functions as the speed reducing device. As a result, the speed reduction ratio (torque increasing ratio) of the gear reducer 18 is increased, thereby causing the power tool 10 to perform low-speed (high-torque) operation.

As shown in FIGS. 5 and 6, contact surfaces 39*a* and 47*a* which are to be brought into contact with each other are respectively formed on the clutch projections 39 of the first carrier 38 and the clutch projections 47 of the second internal gear 46. The contact surfaces 39*a* and 47*a* are formed as an oblique plane inclined with respect to the rotational direction R. Because of this, a repulsive force acting along the axial direction is generated between the mutually-joined clutch projections 39 and 47 in accordance with the torque applied to the tool shaft 20. When the torque applied to the tool shaft 20 is small, a smaller repulsive force is generated between the clutch projections 39 and 47. In this case, the second internal gear 46 is forcefully retained at the first position by the coil spring 72. In other words, the high-speed operation is maintained. On the other hand, when the torque applied to the tool shaft 20 is increased to a predetermined value, the repulsive force generated between the clutch projections 39 and 47 exceeds the force biased by the coil spring 72, which as a consequence moves the second internal gear 46 to the second position. When the second internal gear 46 is moved to the second position, the first carrier 38 is disjoined from the second internal gear 46, resulting in the switching from the high-speed operation to the low-speed operation.

As described above, the clutch projections 39 of the first carrier 38 and the clutch projections 47 of the second internal gear 46 constitute a clutch mechanism for joining the second sun gear 42 and the second internal gear 46 together to prevent the aforesaid gears 42 and 46 from rotating relative to each other while the torque applied to the tool shaft 20 is less than the predetermined value, and releasing the joining between the second sun gear 42 and the second internal gear 46 when the torque applied to the tool shaft 20 reaches the predetermined value. In this manner, the power tool 10 is configured to maintain the high-speed operation as long as the torque applied to the tool shaft 20 remains below the predetermined value, and automatically initiates the low-speed operation when the torque applied to the tool shaft 20 reaches the predetermined value.

As shown in FIGS. 2, 3, and 4, the gear case 60 of the gear reducer 18 is provided with steel balls 64, a lock ring 66, and a coil spring 68. On the other hand, external grooves 80 in which the steel balls 64 can be engaged are formed on an outer peripheral surface 46*c* of the second internal gear 46 as shown in FIGS. 5 and 6. Each external groove 80 has an anterior end 82 and a posterior end 84, and extends from the anterior end 82 to the posterior end 84 along the circumferential direction of the second internal gear 46. It may also be said that the aforesaid circumferential edge of the end surface 46*b* is defined by the external grooves 80 on the outer peripheral surface 46*c*. It should be noted that the anterior end 82 is a boundary located forward with respect to the rotational direction R of the first carrier 38 (and the second sun gear 42), whereas the posterior end is a boundary located rearward with respect to the rotational direction R of the first carrier 38 (and the second sun gear 42). Each external groove 80 has a contact wall 81 extending from the anterior end 82 to the posterior end 84. The contact wall 81 contacts, from an opposite side of the first carrier 38 (i.e. from a second position side), the steel ball 64 engaged in the external groove 80. In this embodiment, the outer peripheral surface 46*c* of the second internal gear 46 is provided with three external grooves 80. However, the number of the external grooves 80 to be formed is not limited to three, and, for example, one or two, or four or more external grooves 80 may be provided.

The steel ball 64 is housed in a through hole 62 formed on the gear case 60. The through hole 62 extends in a radial direction of the gear case 60. The steel ball 64 is capable of moving within the through hole 62 in a forward and backward direction with respect to the second internal gear 46. In this embodiment, three steel balls 64 and three through holes 62 for respectively housing the three steel balls 64 are provided at equal intervals along the circumferential direction of the gear case 60. Because the through holes 62 formed on the gear case 60 are opened so as to extend along the radial direction of the gear case 60, the moving directions of the steel balls 64 are limited to only the radial direction of the gear case 60. Namely, the moving directions of the steel balls 64 are perpendicular to the rotation axis of the second internal gear 46 and also perpendicular to a moving direction of the second internal gear 46.

The lock ring 66 is generally ring-shaped, and retained on the outer peripheral surface of the gear case 60 in a state where the lock ring 66 is able to slide along the axial direction of the gear case 60 and pushed toward the steel ball 64 by the coil spring 68. The lock ring 66 contacts the steel ball 64 from the outer side of the radial direction of the gear case 60. An inclined contact surface 67*a* and a perpendicular contact surface 67*b* to be contacted by the steel ball 64 are formed on an inner peripheral surface of the lock ring 66. The inclined contact surface 67*a* constitutes an oblique plane which is inclined relative to both the moving direction of the steel ball 64 and the moving direction of the lock ring 66. On the other hand, the perpendicular contact surface 67*b* constitutes a plane which is perpendicular to the moving direction of the steel ball 64, but parallel to the moving direction of the lock ring 66.

When the second internal gear 46 is located in the first position as shown in FIG. 2, the steel ball 64 is contacted by the outer peripheral surface of the second internal gear 46, and positioned outside the external groove 80 of the second internal gear 46. In this state, the second internal gear 46 is rotatable relative to the gear case 60, and is also movable relative to the gear case 60 along the axial direction. The lock ring 66 contacts the steel ball 64 through the inclined contact surface 67*a*. The coil spring 68 biases the lock ring 66 against the steel ball 64, which causes the lock ring 66 contacting the steel ball 64 to press the steel ball 64 against the second internal gear 46.

On the other hand, when the second internal gear 46 is moved to the second position, as shown in FIG. 3, because the torque applied to the tool shaft reaches or exceeds the predetermined value, the steel ball 64 comes to be engaged in the external groove 80 of the second internal gear 46. When the steel ball 64 is engaged in the external groove 80 of the second internal gear 46, the contact wall 81 of the external groove 80 contacts the steel ball 64. Because the steel ball 64 is in contact with the contact wall 81 from the opposite side of the first carrier 38 (i.e. from the second position side), the second internal gear 46 is unable to return to the first carrier 38 side (i.e. a first position side). In this configuration, once the second internal gear 46 has moved to the second position, moving back of the second internal gear 46 to the first position is prohibited. Namely, after the torque applied to the tool shaft 20 once reaches or exceeds the predetermined value, re-joining between the first carrier 38 and the second internal gear 46 is prevented even in a case where the torque applied to the tool shaft 20 becomes lower.

In addition, upon engagement of the steel ball 64 in the external groove 80 of the second internal gear 46, the lock ring 66 is moved from the position shown in FIG. 2 to the position shown in FIG. 3 by the biasing force of the coil spring 68. Hereinafter, the position of the lock ring 66 shown in FIG. 2 is referred to as an unlock position, while the position of the lock ring 66 shown in FIG. 3 is referred to as a lock position. The movement of the lock ring 66 to the lock position causes the perpendicular contact surface 67*b* of the lock ring 66 to contact the steel ball 64. The perpendicular contact surface 67*b* of the lock ring 66 is perpendicular to the moving direction of the steel ball 64. Further, the moving direction of the lock ring 66 intersects at right angles with the moving direction of the steel ball 64. For this reason, movement of the lock ring 66 by the force received from the steel ball 64 is prevented, which can ensure that the lock ring 66 retains the steel ball 64 in the external groove 80 of the second internal gear 46.

Figure 7:
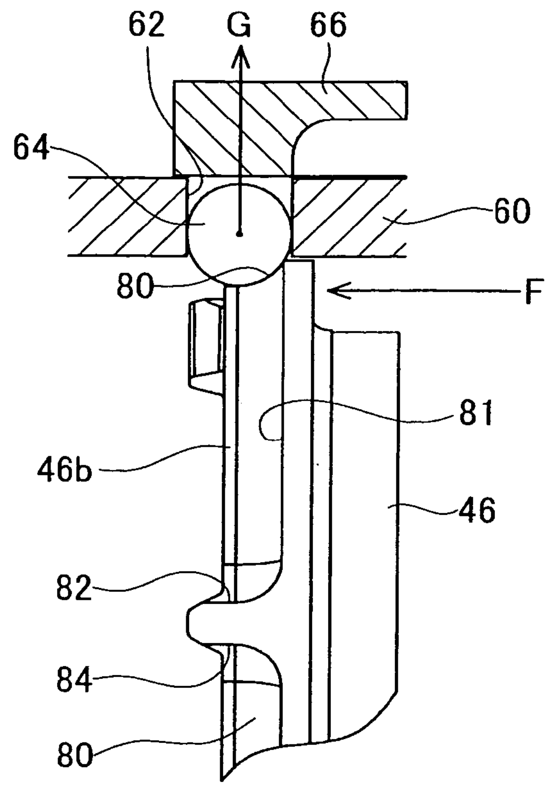
FIG. 7 is a diagram for explaining a cross-sectional profile of an external groove on the second internal gear.

As shown in FIG. 7, the external groove 80 of the second internal gear 46 has a cross-sectional profile curved along the steel ball 64. In this way, when the second internal gear 46 moves from the first position to the second position, the steel ball 64 is thereby guided and thus smoothly inserted in the external groove 80 of the second internal gear 46. Then, the steel ball 64 engaged in the external groove 80 is pushed out along a direction G that leaves away from the external groove 80 by the second internal gear 46 having been pushed along a direction F by the biasing force of the coil spring 72. However, the steel ball 64 engaged in the external groove 80 is contacted by the perpendicular contact surface 67*b* of the lock ring 66, and thereby undesired disengagement of the steel ball 64 from the external groove 80 is prevented.

After the second internal gear 46 is disjoined from the first carrier 38 (including the second sun gear 42), a reaction force from the second planet gears 44 causes the second internal gear 46 to start rotating in a direction opposite to that of the first carrier 38 (and the second sun gear 42). Consequently, the steel ball 64 engaged in the external groove 80 is brought into contact with the anterior end 82 of the external groove 80 by the rotation of the first carrier 38. As a result, the second internal gear 46 is non-rotatably secured to the gear case 60.

Figure 8:
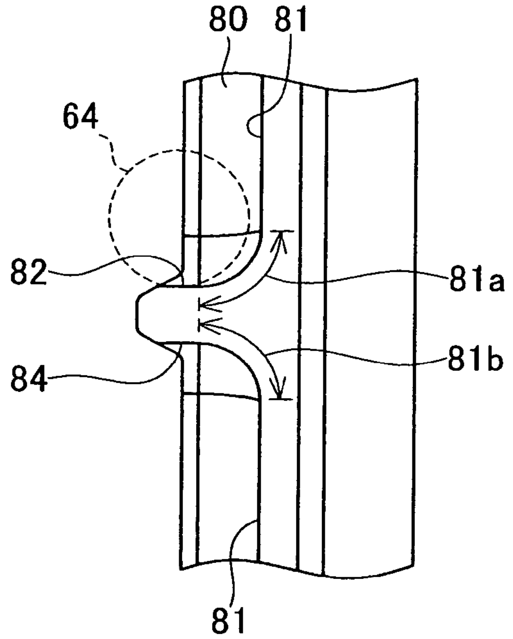
FIG. 8 is a diagram for explaining a shape of opening at both ends of the external groove on the second internal gear.

With reference to FIG. 8, a structure in the vicinity of the anterior end 82 of the external groove 80 will be described below. As shown in FIG. 8, a part 81*a* of the contact wall 81 adjacent to the anterior end 82 is gradually shifted to the first position side (left side in FIG. 8) toward the anterior end 82. In other words, the part 81*a* is shifted toward the first carrier 38. The aforesaid configuration of a part of the wall 81 (i.e. the part 81*a*) being "shifted" may also be explained that the part 81*a* of the wall 81 is curved with respect to the substantially straight portions of the wall 81 that extends from the anterior end side toward the part 81*a*, such that the edge of the part 81*a* is positioned closer to the first position than the edge of the aforesaid straight portions of the wall 81. Furthermore, the part 81*a* is curved along an arc whose radius is greater than that of the steel ball 64.

According to the above-described structure, when the anterior end 82 of the external groove 80 contacts the steel ball 64, the second internal gear 46 moves so as to be further separated away from the first carrier 38. In this way, re-joining between the second internal gear 46 and the first carrier 38 is prevented, and the operation mode is smoothly switched from the high-speed operation to the low-speed operation. The movement of the second internal gear 46 as described above is caused by the reaction force that the second internal gear 46 receives from the second planet gears 44. Because the reaction force exerted from the second planet gears 44 on the second internal gear 46 is sufficiently large enough, the above-described movement of the second internal gear 46 is reliably accomplished.

As shown in FIG. 8, a part 81*b* of the contact wall 81 adjacent to the posterior end 84 is also shifted to the first position side (left side in FIG. 8) toward the posterior end 84. In other words, the part 81*b* is also shifted toward the first carrier 38 along the arc whose radius is greater than that of the steel ball 64.

In this embodiment, because the steel ball 64 is a sphere in shape, the steel ball 64 starts entering the external groove 80 of the second internal gear 46 before the second internal gear 46 is completely moved to the second position. At this point of the entering, the second internal gear 46 is integrally rotating with the first carrier 38 (and the second sun gear 42). Therefore, the steel ball 64 which is partially engaged in the external groove 80 is brought into contact with the posterior end 84 of the external groove 80. Here, if the part 81*b* of the contact wall 81 adjacent to the posterior end 84 is shifted to the first carrier 38 side, the second internal gear 46 moves to the second position while trying to be further separated away from the first carrier 38, with a result that the joining between the second internal gear 46 and the first carrier 38 is quickly released.

It should be noted that, the parts 81*a* and 81*b* of the contact wall 81 adjacent to the anterior end 82 and adjacent to the posterior end 84 may be curved in the shape of the arc as described above; or the parts 81*a* and 81*b* may be shifted in the following other types of curvilinear line or straight line.

Next, a configuration associated with a return action from the low-speed operation mode to the high-speed operation mode will be described. As shown in FIGS. 2, 3, and 4, an unlock ring 70 is mounted on the gear case 60 of the gear reducer 18.

The unlock ring 70 is generally ring-shaped, and retained on the outer peripheral surface of the gear case 60. The unlock ring 70 is slidable along the axis direction of the gear case 60, and connected to the trigger switch 24 through a link (not illustrated).

Figure 9:
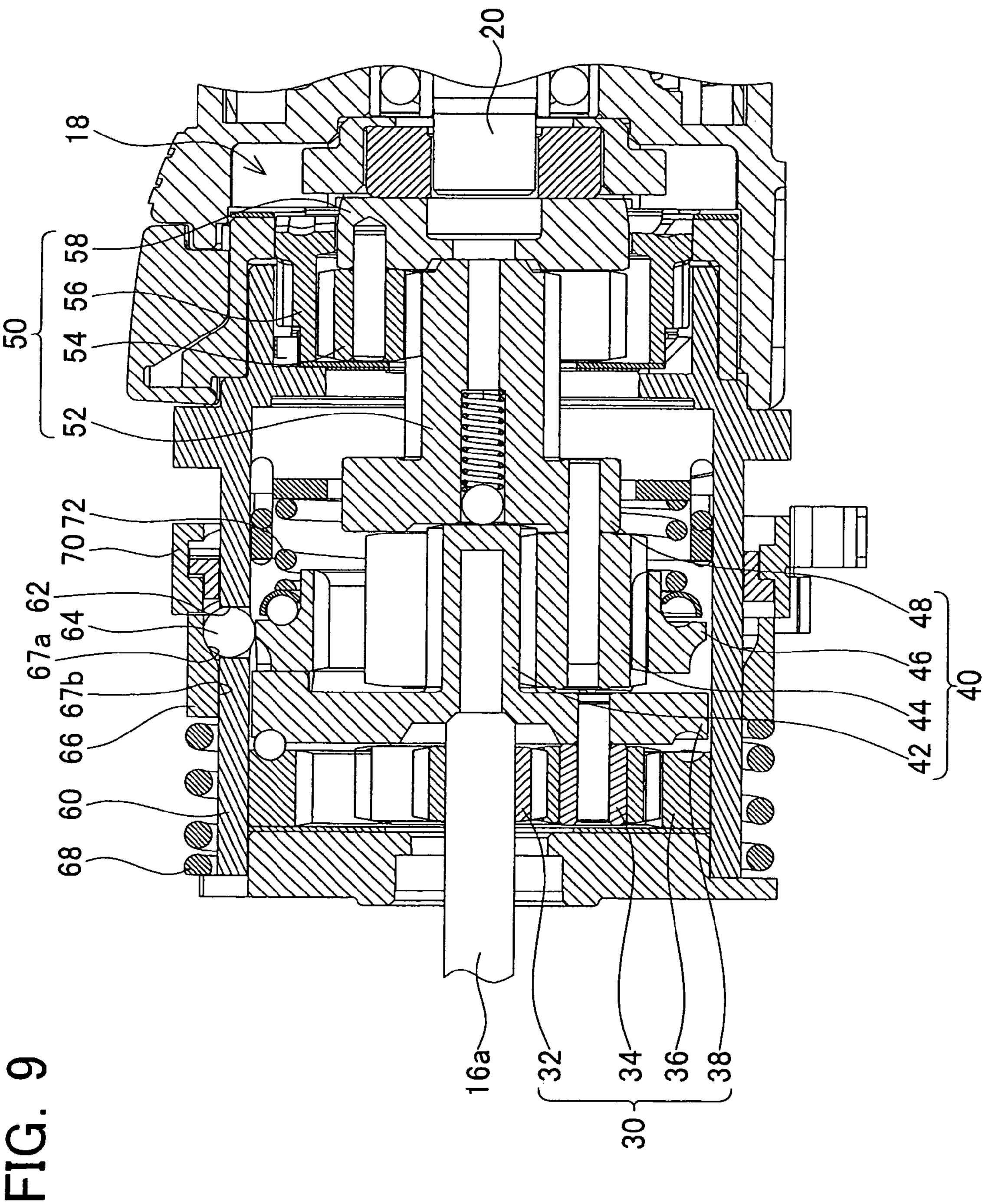
FIG. 9 is a diagram for explaining a return action performed by an unlock ring for returning to a high-speed operation mode.

In the low-speed operation mode, as shown in FIG. 3, the lock ring 66 located to a tool shaft 20 side is in contact with the unlock ring 70. In this state, the trigger switch 24 has been turned on. Upon the completion of work, the user turns the trigger switch 24 off. As shown in FIG. 9, the unlock ring 70 is interlocked with the off operation of the trigger switch 24 and moved together with the lock ring 66 to a motor 16 side. The steel ball 64, which is forced out along the direction G that leaves away from the external groove 80 of the second internal gear 46 (refer to FIG. 7), is disengaged from the external groove 80 of the second internal gear 46 by the movement of the lock ring 66. Upon the disengagement of the steel ball 64 from the external groove 80 of the second internal gear 46, the second internal gear 46 is moved to the first position by the force exerted by the coil spring 72. As a result, the second internal gear 46 is re-joined to the first carrier 38 (and the second sun gear 42), thereby returning the gear reducer 18 to the high-speed operation mode.

As has been described above, in the power tool according to this embodiment, the operation mode of the power tool is smoothly switched from the high-speed operation to the low-speed operation by the increase of the torque applied to the tool shaft. Then, after the switching of the operation mode from the high-speed operation to the low-speed operation, the operation mode is prevented from being switched back again to the high-speed operation even when the torque applied to the tool shaft 20 becomes lower. Moreover, after the completion of work such as a screw tightening work, by turning off the trigger switch 24, the gear reducer 18 automatically returns to a state of being ready to perform the high-speed operation.

The specific embodiment of the present teachings are described above, but merely illustrates some possibilities of the teachings and do not restrict the scope as claimed. The art set forth in the claims includes variations and modifications of the specific examples set forth above. Some examples of the variations and modifications will be given below.

For example, the prime mover may be replaced with a pneumatic motor or a small engine in the above-described power tool 10, so that a pneumatic or engine-type power tool having the same functions as described above may be embodied.

The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

What is claimed is:

1. A power tool comprising:

a prime mover;

a tool shaft that is driven by the prime mover;

a planetary gear mechanism that is disposed between the prime mover and the tool shaft, the planetary gear mechanism comprising a sun gear, at least one planet gear, an internal gear, and a carrier;

a moving member that is configured to be at a first position while a torque applied to the tool shaft is less than a predetermined value and to move to a second position when the torque applied to the tool shaft reaches the predetermined value, wherein the moving member causes the internal gear to rotate integrally with the sun gear when being at the first position, and prohibits the internal gear from rotating when being at the second position; and at least one latch member that is configured to engage with the moving member when the moving member has moved to the second position and prohibit the moving member from moving back to the first position when the at least one latch member engages with the moving member.

2. A power tool as set forth in claim 1, wherein the moving member comprises at least one catching portion for engaging with the at least one latch member, and the at least one latch member is configured to move to and engage with the at least one catching portion when the moving member moves to the second position.

3. A power tool as set forth in claim 2, wherein a moving direction of the at least one latch member is substantially perpendicular to a moving direction of the moving member.

4. A power tool as set forth in claim 3, wherein the moving direction of the moving member is substantially parallel to an axial direction of the internal gear of the planetary gear mechanism, and the moving direction of the at least one latch member is substantially perpendicular to the axial direction of the internal gear of the planetary gear mechanism.

5. A power tool as set forth in claim 4, wherein the moving member is ring-shaped and disposed coaxially with the internal gear of the planetary gear mechanism.

6. A power tool as set forth in claim 5, wherein the ring-shaped moving member and the internal gear of the planetary gear mechanism are integrally composed of a single member, the internal gear of the planetary gear mechanism is formed on an inner peripheral surface of the ring-shaped moving member, and the at least one catching portion is formed on an outer peripheral surface of the ring-shaped moving member.

7. A power tool as set forth in claim 6, wherein the at least one catching portion of the moving member has an anterior end and a posterior end with respect to a rotational direction of the sun gear and extends from the anterior end to the posterior end along a circumferential direction of the moving member.

8. A power tool set forth in claim 7, wherein the at least one catching portion has a contact wall that contacts the at least one latch member from a second position side, the contact wall extends from the anterior end to the posterior end, and a part of the contact wall adjacent to the anterior end is shifted to the first position side toward the anterior end.

9. A power tool as set forth in claim 8, wherein the at least one latch member is sphere-shaped, and the part of the contact wall adjacent to the anterior end is curved along an arc that is larger in radius than the sphere-shaped latch member.

10. A power tool as set forth in claim 7, wherein a part of the contact wall adjacent to the posterior end is shifted to the first position side toward the posterior end.

11. A power tool as set forth in claim 1, further comprising:

a lock member that functions, when the at least one latch member engages with the moving member, to retain engagement of the at least one latch member and the moving member.

12. A power tool as set forth in claim 11, wherein the lock member is configured to move from an unlock position to a lock position when the at least one latch member engages with the moving member, the lock member has a perpendicular contact surface that contacts the at least one latch member when the lock member moves to the lock position, and the perpendicular contact surface is perpendicular to the moving direction of the at least one latch member, and parallel to a moving direction of the lock member.

13. A power tool as set forth in claim 12, wherein the lock member has an inclined contact surface that contacts the at least one latch member when the lock member is in the unlock position, and the inclined contact surface is inclined with respect to both the moving direction of the latch member and the moving direction of the lock member, wherein the inclined contact surface forces the lock member to push the latch member toward the moving member when the latch member is not engaged with the moving member.

14. A power tool as set forth in claim 1, further comprising:

a tool chuck fixed to the tool shaft and configured to detachably hold a tool bit.

15. A power tool as set forth in claim 14, wherein the tool bit is a driver bit.

16. A power tool as set forth in claim 14, wherein the tool bit is a drill bit.

* * * * *